United States Patent [19]
Merkle et al.

[11] 3,845,339
[45] Oct. 29, 1974

[54] PERMANENT MAGNET ROTOR ELECTRIC MOTOR

[75] Inventors: Alfred Merkle, St. Georgen; Fritz Schmieder, Hornberg; Werner Heinzmann, St. Georgen, all of Germany

[73] Assignee: Papst-Motoren KG, St. Georgen/Black Forest, Germany

[22] Filed: Aug. 31, 1972

[21] Appl. No.: 285,520

[30] Foreign Application Priority Data
Sept. 1, 1971 Germany.......................... 2143752

[52] U.S. Cl................ 310/156, 310/68, 310/268, 318/254
[51] Int. Cl. .......................................... H02k 21/12
[58] Field of Search ............... 310/68, 67, 268, 156; 318/132, 138, 254

[56] References Cited
UNITED STATES PATENTS
271,928   2/1883   Seeley............................ 310/268
3,280,353  10/1966  Haydon et al. ................ 310/268 X
3,303,371   2/1967  Moressee et al............... 310/156 X
3,327,190   6/1967  Reich............................. 318/132 X
3,348,086  10/1967  Monma........................... 310/268
3,644,765   2/1972  Janson........................... 318/254 X Primary Examiner—D. F. Duggan
Attorney, Agent, or Firm—Michael S. Striker

[57]   ABSTRACT

An electric motor, particulary a collectorless D.C. motor, has a stator including a support portion having a passage and a generally plate-shaped winding arrangement fixedly mounted on the support portion and surrounding the passage. The rotor includes a rotatable motor shaft extending through the passage and a plurality of axially polarized magnets mounted on said shaft for rotation therewith and axially spaced from the winding arrangement and defining therewith an axial air gap.

14 Claims, 12 Drawing Figures

PATENTED OCT 29 1974
3,845,339
SHEET 1 OF 5
Fig. 1
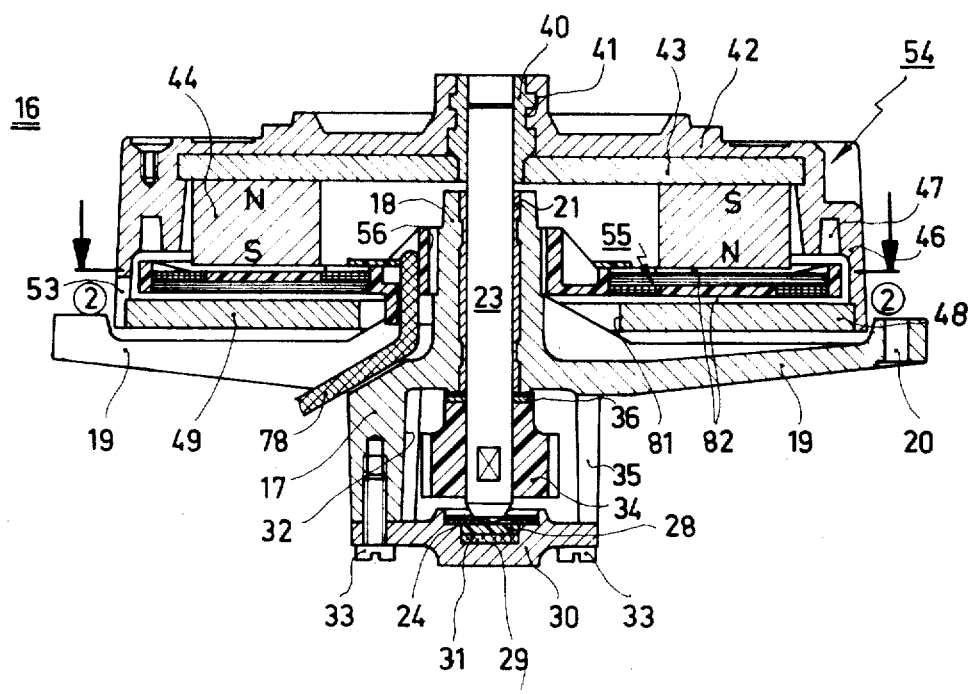
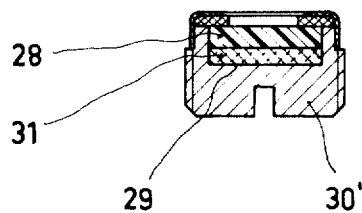
Fig. 1a

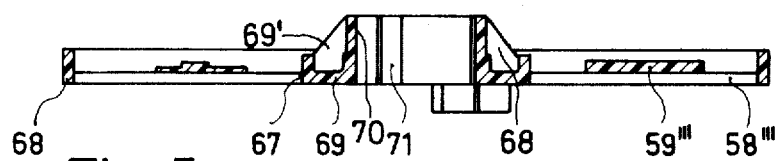
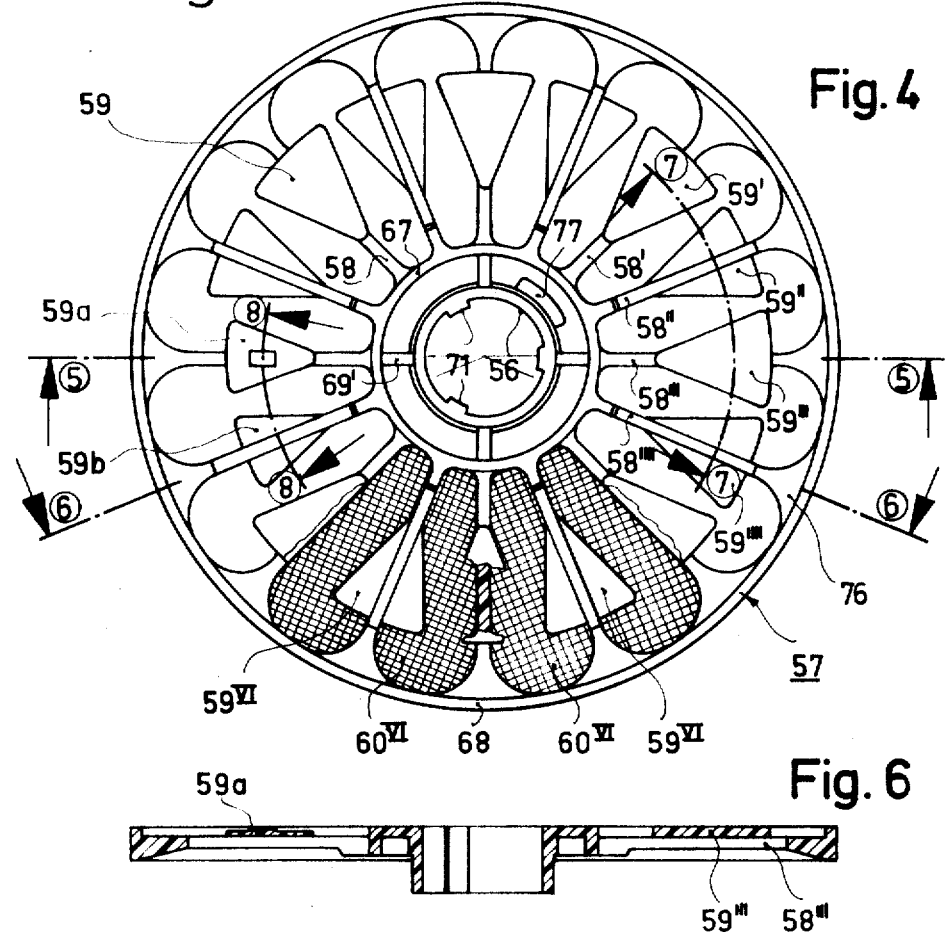
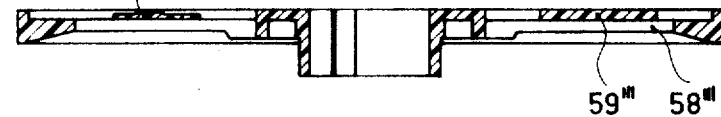
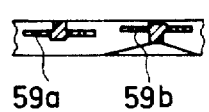
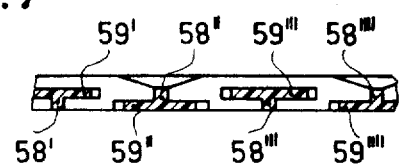

PERMANENT MAGNET ROTOR ELECTRIC MOTOR

BACKGROUND OF THE INVENTION

For many purposes motors are required having a small axial length and a large moment of inertia. This applies for example to record players, tape recorders and the like.

German patent specification 598,788 discloses an electric motor of this kind in which the winding, which has the appearance of a disk, is attached to the turntable of a record player and rotates with it, the iron of the turntable serving at the same time as part of the magnetic circuit. As a result of the relatively small mass of the winding, the rotor of such a motor possesses only a relatively small moment of inertia, and the bearing arrangement poses difficulties. In addition, the armature winding must be supplied with current by means of a collector.

SUMMARY OF THE INVENTION

It is a general object of the invention to overcome the disadvantages of motors of this type.

More particularly it is an object of the invention to provide a motor with a rotor having a larger moment of inertia.

It is another object to provide such a motor which does not require that the energizing winding be supplied with current by means of a collector.

It is a further object to provide such a motor having quiet operating characteristics.

It is a still further object to provide such a motor that is capable of developing a steady torque even at low rotor speeds.

It is yet another object to provide an advantageous method of assembling a motor of the type in question.

These objects, and others which will become more understandable below, can be met according to the invention by an electric motor, particularly a collectorless D.C. motor, having a stator which includes a support portion having a passage and a generally plate-shaped winding arrangement fixedly mounted on the support portion and surrounding the passage. The motor further has a rotor including a rotatable motor shaft extending through the aforementioned passage and a plurality of axially polarized magnets mounted on the motor shaft for rotation therewith and axially spaced from the winding arrangement and defining with the winding arrangement an axial air gap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is an axial section through a motor according to one embodiment of the invention;

FIG. 1a depicts a modification of part of the arrangement shown in FIG. 1;

FIG. 4 is a view of the carrier arrangement shown in FIG. 2 but with the windings removed, except for two schematically depicted windings at the bottom of FIG. 4;

FIG. 5 is an axial section through the winding carrier of FIG. 4, taken on line 5—5 of FIG. 4, and with the windings removed;

FIG. 6 is a view similar to FIG. 5, but taken on section line 6—6 in FIG. 4;

FIG. 7 is a sectional view taken on line 7—7 of FIG. 4;

FIG. 8 is a sectional view taken on line 8—8 of FIG. 4;

DESCRIPTION OF THE PREFERRED EMBODIMENTS

Figure 3:
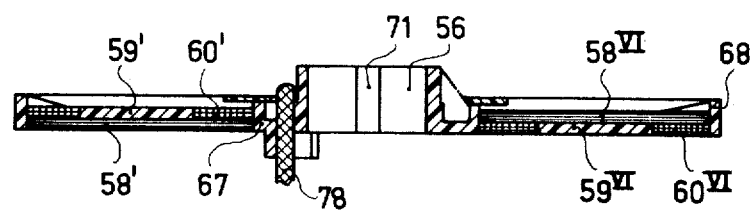
FIG. 3 is a section through the winding arrangement shown in FIG. 2, taken on lines 3—3, and illustrating in section the windings carried on the carrier arrangement.

FIG. 1 depicts a first electric motor according to the invention. This motor has a stationary hollow support portion 17 with a hollow cylindrical part 18 and lateral supporting arms 19 constituting mounting means. These latter mounting means have at their ends bores 20 for mounting the motor onto a support structure, for instance onto a frame of a record player or tape recorder.

A brass bushing 21 is cast into the hollow cylindrical bearing portion 18. The motor shaft 23 is rotatable in and supported by the bushing 21. Shaft 23 has a rounded end 24 which rests on a plastic support plate 28. The plastic plate 28 in turn rests on a rubber plate 31 located in a recess 29 of a cover arrangement 30. FIG. 1a shows an alternative axial bearing arrangement for the rounded end of shaft 23. The bearing shown in FIG. 1a is provided with external screw threads for axial adjustment of the bearing. Such configuration permits axial adjustments of the position of the motor shaft 23.

The cover arrangement 30 serves to close off in part a chamber 32 defined by the stator support portion 17. Cover arrangement 30 is mounted on the stator support portion 17 by means of screws 33. An output gear 34 of plastic material is mounted on motor shaft 23 and is accommodated within chamber 32. The wall of chamber 32 has an opening laterally of the output gear 34, and this opening permits access to gear 34 of a further, non-illustrated gear to be driven by the motor. Such driven gear may for instance be the gear of a phonograph record changer. Disk 36, serving as an auxiliary bearing, is arranged between the upper endface of the output gear 34 and the lower endface (as seen in FIG. 1) of the hollow cylindrical part 18 of stator support portion 17. Pressed onto the upper end of shaft 23 is a steel bushing 40 having radially outwardly extending connecting ribs 41. These ribs serve for the support on bushing 40 of a generally cup-shaped support member 42 of the rotor. In the illustrated embodiment cup-shaped part 42 is made of aluminum. Cast into member 42 is a plate 43 of soft iron. Plate 43 can be formed of laminated material, and can for instance by formed by spirally coiling a long narrow strip of ferromagnetic material. Plate 43 performs two functions. Firstly, it serves as part of the magnetic circuit of the motor, and secondly it prevents to a great degree the magnetic field of the motor from having an undesired influence in the region above plate 43, as seen in FIG. 1. This latter effect is particularly important, for instance, in the case of a record player or tape recorder having a magnetic pick-up, inasmuch as interfering fields can lead to hum interference.

Mounted on plate 43, for instance by means of magnetizable adhesive material, is a magnetic ring 44 of ceramic magnetic material preferentially aligned in axial direction. Preferentially aligned signifies that the magnetic ring even while it is being manufactured is subjected to a high magnetic force. The magnetic ring is polarized in axial direction and advantageously has a very high coercive force. The magnetic ring actually consists of a plurality of ring sectors, each constituting an axially polarized north-south pair. These sectors are of alternate polarization. That is, axially polarized north-south pairs alternate with axially polarized south-north pairs. This is schematically indicated in FIG. 1 by the letters N,S. The magnetic ring 44 of FIG. 1 has eight such north-south pairs.

Referring to the magnetizable adhesive layer which bonds the plate 43 to the ring 44, it is particularly advantageous if such layers are of a material which is plastic prior to its solidification. Such a material advantageously includes iron powder in sufficient quantity to form a pasty mass. The plasticity of the adhesive layer is particularly advantageous during production of the motor, because it permits careful positioning of the magnetic ring 44 on the plate 43. In particular the ring 44 can be positioned equidistantly from plate 43, in order to avoid an expensive grinding operation after the assembly.

The cup-shaped member 42 has sidewalls provided with circumferentially extending recesses 47 which if necessary can accommodate extra material necessary to balance the rotor. At the rim of cup-shaped member 42 a circumferentially extending shoulder 48 is provided. This shoulder 48 serves to position a ferromagnetic disk 49 which is held in place on the rotor member 42 by the force of attraction of magnetic ring 44. If a motor is constructed on the scale of FIG. 1, the force of attraction in question might for example amount to about 3.5 kp. In order to prevent uncontrolled attraction of disk 49 to the rotor during assembly of those parts, several lateral openings 53 are provided in the side wall of cup-shaped member 42, near the rim thereof. These lateral openings 53 permit the periphery of disk 49 to be engaged during assembly so that the disk 49 can be carefully placed in position with respect to rotor part 42. Also, lateral openings 53 permit engagement of the periphery of disk 49 for purposes of removal, for instance during repair. Plate 49 can be made of laminated material, for instance made of a long strip of material rolled up into a coil having the illustrated configuration. As will be appreciated, disk 49 will rotate with cup-shaped rotor part 42, during operation of the motor. Not only does disk 49 serve as part of the magnetic circuit of the motor; it additionally serves advantageously to shield cover arrangement 30 from the force of attraction of ring 44, to a significant degree. As a result, the force exerted upon cover arrangement 30 will be almost entirely only that due to the axial bearing stress of the shaft 23 itself; the cover arrangement 30 will not have to overcome an additional force exerted by the shaft by reason of attraction between the ring 44 and the cover arrangement 30. It is emphasized that this relative disposition of parts and the resulting advantage is entirely new in the art and of considerable practical significance.

The stator, generally indicated by numeral 55, is pressed with its inner periphery 56 onto the outer periphery of hollow cylindrical member 18. Alternatively, however, it is possible to mount the stator on part 18 by use of adhesives.

Figure 2:
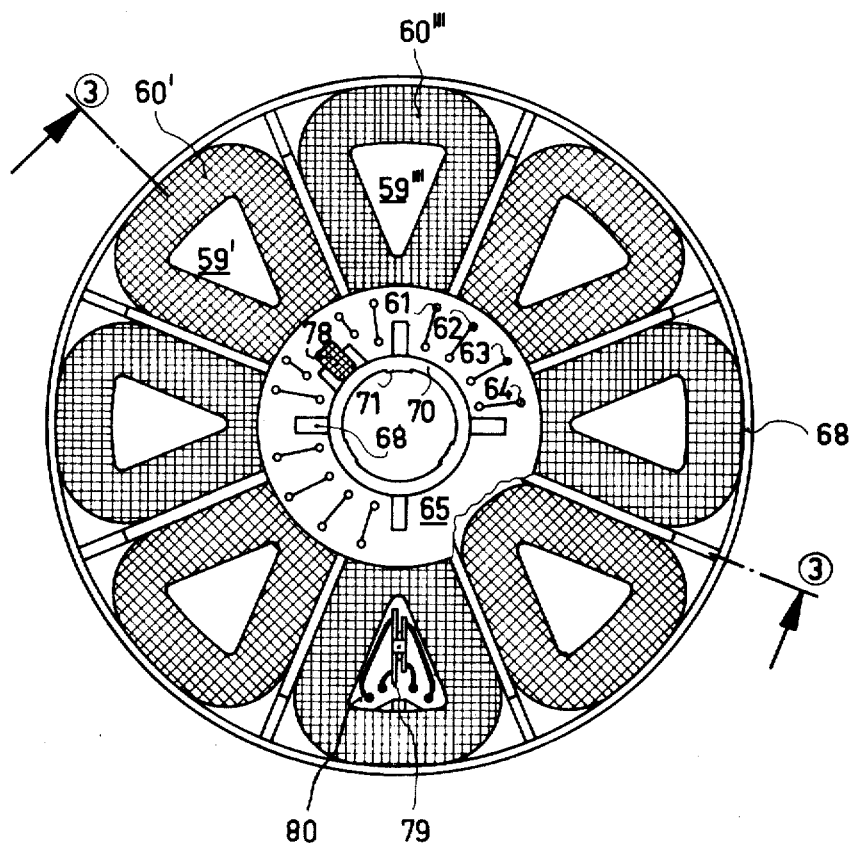
FIG. 2 is a section taken on line 2—2 of FIG. 1, showing only the motor windings, in schematic form, and a carrier arrangement for the windings.
Figure 11:
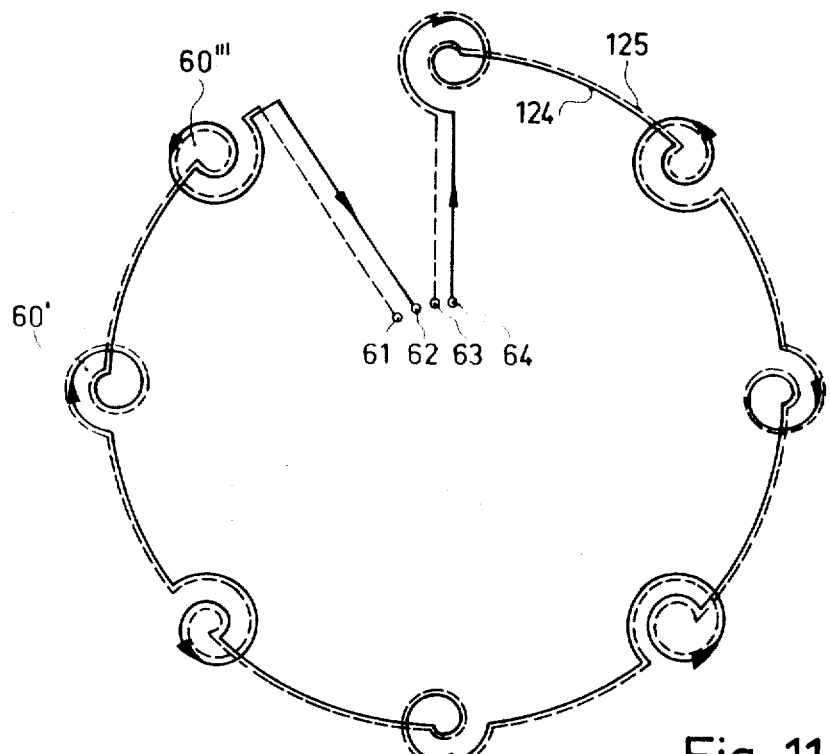
FIG. 11 is a diagram indicating the manner in which the windings are wound.

The winding arrangement of the stator of the motor is indicated in FIG. 1 to lie axially intermediate magnetic ring 44 and the ferromagnetic disk 49. Details of the construction of the winding arrangement of the stator will be particularly evident from FIG. 4. FIG. 4 shows a carrier arrangement for the stator windings, the carrier arrangement having the general appearance of a wagon wheel. The windings have been removed for the sake of clarity, except that two windings are schematically indicated near the bottom of the Figure. The carrier arrangement illustrated in FIG. 4 is advantageously made of injection-molded plastic having an amorphous structure, for instance "Trogamid" (manufactured by the Dynamit-Nobel Company of Sweden). It is important that the carrier arrangement illustrated have excellent shape retaining characteristics. The wheel-like carrier arrangement has an outer ring or rim 68 and an inner ring or rim 67. Inner ring 67 is of generally J-shaped cross section, as indicated in FIG. 5, and has four radially extending supporting webs 69'. A plurality of spoke-like members 58 extend in radial direction of the carrier arrangement. Half of the members 58 lie in a first plane located at one axial side of the carrier wheel, while the other half of the members 58 lie in a second plane located at the other axial side of the carrier wheel. This is particularly evident from FIG. 7 which shows four such radial ribs 58', 58'', 58''' and 58''''. Ribs 58' and 58''' lie in one plane whereas ribs 58'' and 58'''' lie in another plane. Each radial rib 58 is cast integral with a triangular widened portion 59. The portion 59 associated with each rib 58 lies in the plane not of the respective rib, but rather in the plane of the adjoining ribs. These widened areas are indicated as 59' to 59'''' in FIG. 7. The outer periphery of each triangular part 59 engages the complimentary inner periphery of one respective winding. Thus, each winding will be centered about a respective triangular member 59 and derives support from the backs of two adjoining members 59. In FIG. 7, for example, one generally triangular winding will be centered about triangular part 59''' and will lie in the general plane of the triangular member. Each of the windings 60 actually includes two wires wound together, this being done without coil form and with what are known as back-lackered wires, the varnishing of which becomes adhesive on being heated with the result that after being wound the windings 60 form rigid units. The two windings in one of the aforementioned planes are wound continuously, that is, all the windings carried by the illustrated carrier arrangement are formed from only four distinct wires, the windings of two wires lying in one of the planes and the windings of the other two wires lying in the other of the planes. Thus, there are four separately energizable winding arrangements. The manner of the windings is illustrated in FIG. 11. The four terminals 61, 62, 63 and 64 and the winding arrangement shown in FIG. 11 are conducted to corresponding soldering points on a circuit board 65 which is secured to the carrier member 57 by means of a snap connection. Circuit board 65 (see FIG. 2) carries a plurality of such terminals and also printed circuitry associated with control circuitry of the motor. It will be noted that the circuit board 65 overlies a radially innermost portion of the winding 60 shown in FIG. 2. The winding circuit of the lower plane is energized by current 90° out of phase relative to the energizing current for the winding of the other plane. In FIG. 4, two disk coils $60^{VI}$ of the lower layer are depicted as being centered on corresponding widened areas $59^{VI}$ of the lower plane.

All the windings 60 are adhered onto the carrier arrangement 57 to form with the latter a stable, rigid and self-supporting arrangement which would also be suitable for a rotating armature. The coils 60 of the lower plane are two-wired and continuously wound like the coils of the upper plane; the wiring diagram according to FIG. 11 also applies to these latter coils.

The web-like ribs 58 are each secured with their inner ends to a continuous ring 67 and with their outer ends to a continuous ring 68. As can be seen in FIG. 5, the inner ring 67 is joined by radial webs 69' and the connecting web 69 to a retaining ring 70 provided with three longitudinal ribs 71. The longitudinal ribs 71 are pressed onto the outside of the hollow cylindrical part 18 and are connected to the latter in force-fit manner. At their outer ends, the rings 59 merge into widened areas 76 whose outlines are complementary to the outlines of respective windings.

In the radially extending connecting web 69 (FIG. 5) a recess 77 (FIG. 4) is provided for the bringing through of the connecting cable, the individual wires of which are connected to respective soldering terminals of the circuit board 65.

Also mounted on carrier arrangement 57 are two Hall generators mounted on respective triangular members associated with the windings that are 90 electrical degrees spaced. One alternater 79 is arranged on a circuit plate 80 and is fixed to a top side of a widened area 59a (FIGS. 4,6) which lies in the upper plane and which is somewhat thinner than the other widened areas 59, so as to accommodate the Hall generator. In a similar manner, an identical Hall generator is affixed to the bottom side of a widened area 59b (FIG. 4) which lies in the lower plane. The terminals of these Hall generators are connected to wires which are conducted over the web-like members 58 to the circuit board 65. Control of the illustrated four-wire motor can be formed, for instance, by means of known circuitry published in volume 23 of the Elektrotechnische Zeitschrift ETZ, VDE-Verlag, Berlin (1971), Section B, page 238. The circuit arrangement of the Hall generators and of the four windings is described in that publication in detail and need not be repeated here. The method employed in the illustrated embodiment for attaching the Hall generators to the winding arrangement is very simple and convenient.

The electric motor 16 shown in FIGS. 1–8 is assembled as follows:

The disk-like return plate 49 is sintered on support portion 17, with the inner periphery of disk 49 surrounding portion 17. The stator 55 is then pressed onto the cylindrical hollow member 18 and the connecting cable 78 is conducted downwardly and outwardly, as shown in FIG. 1. The shaft 23, which is already joined to the rotor 54, is introduced from above into the bearing 21, the plate 49 being held in position during the assembly by a suitable tool. As shaft 23 is inserted, cover arrangement 30 is not yet in position, but a suitable tool located at the position later occupied by cover arrangement 30 limits the axial movement of the shaft. Once the shaft, and therefore cup-shaped member 42, are in position, ferromagnetic disk 49 is cautiously permitted to rise towards the magnetic ring 44 by action of the force of attraction. Care is taken that the disk 49 be received at the rim of member 42 and rest on the shoulder 48 thereof. The output gear 34 is mounted in the shaft 23 and the cover arrangement 30 is put into place. The motor 16 is then mounted on a suitable structural support, for instance the frame of a tape recorder or record player. Stator 55 is thus located in the air gap 82 between the magnetic ring 44 and the ferromagnetic disk 49.

A rotating field is established by the stator windings by exciting successive ones of the windings and in conventional manner the ring 44 of the rotor rotates with such rotating field. Because of the considerable number of poles provided in the illustrated embodiment the rotational speed will be relatively low, due to the possibility for example of having the output gear 34 drive a turntable for instance without the use of intermediate gearing.

Figure 9:
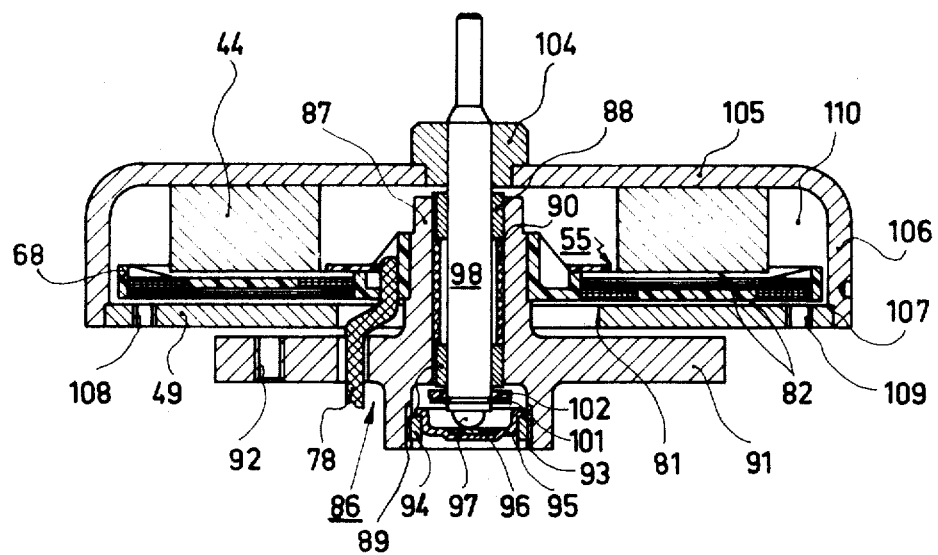
FIG. 9 is an axial sectional view through a motor according to a second embodiment of the invention.

FIG. 9 illustrates another embodiment according to the invention constituting a modification of the embodiment of FIGS. 1–8. Elements performing equivalent functions to those parts of FIGS. 1–8 are designated by the same reference numerals and will not be described again. The stator 55, namely the windings and carrier arrangement for the windings, is identical to that of the embodiment previously described. In FIG. 9 the supporting portion corresponding to the earlier-described supporting portion 17 is designated with numeral 86. Supporting portion 86 has at its upper end (as seen in FIG. 9) a hollow cylindrical bearing member 87 with two inserted sintered bearings 88m 89 and an oil storage felt 90 arranged between them. The lower third of the bearing member 87 flares out to form a mounting flange 91 with tap bores 92. A cover portion 94 includes a ring which is screw threadedly mounted on the supporting portion 86. Ring 94 is similar in function to the cover arrangement 30' of FIG. 1a, in that it permits axial adjustment of the position of the motor shaft 98. The ring 94 retains in position a sheet metal dish 95 which in turn holds a plastic plate 96 serving as axial bearing on which is supported a ball member 97 accommodated in a central recess in the end face of shaft 98. A circlip 101 is mounted on the shaft 98 above the ball 87 in a groove of the shaft and serves to support a plastic ring 102 located between the circlip 101 and sintered bearing 89, the plastic ring 102 serving as an additional axial bearing.

A generally cup-shaped soft-iron rotor part 105 is attached to the upper end of shaft 98 by a press fitting operation. Specifically cup-shaped member 105 is welded to a bushing 104 which is press-fitted onto the shaft 98. As before, cup-shaped member 105 has near its rim a circumferentially extending shoulder 107 which serves to retain in position a ferromagnetic return member or disk 49. Return member 49 is provided with bores 108, 109 for purposes of assembly.

Magnetic ring 44 is mounted on cup-shaped part 105 in the same manner as described before. There is a sizable circumferential airgap 110 between the outer peripheral surface of the ring 44 and the inner peripheral surface of the sidewalls 106 of cup-shaped member 105. This sizable airgap is included to prevent the development of magnetic short circuits of the magnets of ring 44.

When the motor shown in FIG. 9 is assembled, the disk or return member 49 is initially laid to rest on the flange 91 and centered about the supporting portion 86. The disk is held in such a preliminary position during assembly by means of screws received within bores 108, 109 of the disk. The stator 55 is pressed onto the supporting portion 96, the cable 78 being threaded through an axially extending bore in the flange 91. Thereupon, the shaft 98, already carrying the bushing 104 and cup-shaped member 105, is introduced into the sintered bearings 88 and 89. The plastic ring 102 is set in place, the circlip 101 is secured, and finally the sheet-metal dish 95 is inserted by means of the tapped ring 94. Tapped ring 94 also serves to adjust the size of the desired airgap 82. This part of the assembly having been completed, the screws in the tapped bores 108, 109 are carefully loosened, while at the same time the force of attraction of magnetic ring 44 lifts the plate 49 until the latter can move no further by reason of engagement of its periphery against the circumferentially extending shoulder 107. The manner in which the motor of FIG. 9 operates is identical to the operation of the motor previously described.

Figure 10:
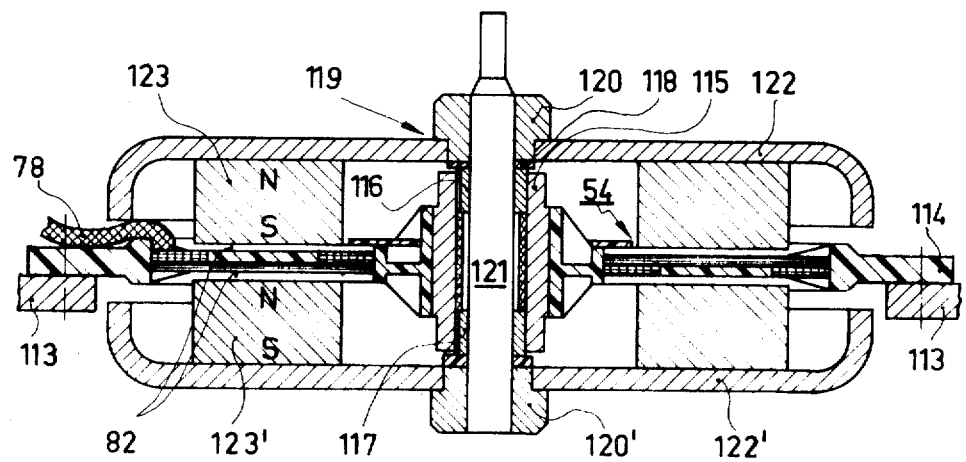
FIG. 10 is an axial sectional view through a motor according to a third embodiment of the invention.

FIG. 10 depicts a third embodiment according to the invention. The motor of FIG. 10 is particularly adapted to be mounted in the opening of a plate 113, or the like. The stator 54 corresponds substantially to that shown in FIGS. 1–8, with the exception that the connecting cable 78 emerges from the motor at the side thereof. Moreover, the carrier arrangement for the windings has a radially outwardly extending flange-like extension 114 which can be joined to the plate 113 for purposes of mounting. In other respects, the embodiment of FIG. 10 is substantially the same as the embodiments previously described.

In the embodiment of FIG. 10, a hollow cylindrical supporting member 115 with two sintered bearings 116, 117 is secured to the inner periphery of the carrier arrangement for the windings. At the upper side of member 115 is located a plastic ring 118 which serves as an axial bearing and which cooperates with the sintered bearing 116. Such a combination can of course be replaced by embedding these members in ball bearings.

The rotor of FIG. 10 is generally designated by the numeral 119 and is composed of two generally cup-shaped parts 122 and 122' which face each other and which are connected by way of bushings 120, and 120'. These bushings are connected to shaft 121, the shaft being mounted in the bearings 116, 117. Mounted on each of these parts 122 and 122' is a magnetic ring 123, 123' the arrangement being such that, as shown in FIG. 10, unlike poles face each other. This arrangement results in a particularly homogeneous field in the airgap 82 and consequently a high torque. In other respects, the method of operation corresponds to that described before. That is, when a rotating field is generated by excitation of the windings of stator 54, the rotor 119 will rotate so as to follow such field.

Reference has already been made to FIG. 11 which depicts the winding arrangement of two wires of the four-wire two-layer winding arrangement. The two parallel conductors of the windings of one layer are indicated by a full line 124 and a dashed line 125. The arrows indicate the direction of current flow in the different coils of the conductors, the coil direction of successive windings alternating, so as to produce alternating north-south and south-north pairs. An induced voltage proportional to the speed of rotation of the rotor is taken off one ne of the wires not actually being used to generate the rotating magnetic field. Such a speed-dependent voltage is employed in a known manner for controlling the speed of the motor.

The widened triangular portions 59a and 59b, shown in FIG. 4, are the ones mentioned before as carrying electronic components of the control circuitry for the motor. It has already been mentioned that the winding arrangement of one layer is energized with current 90° out of phase with the winding arrangement of the other layer. It is advantageous if the triangular areas 59a, 59b chosen to carry the electronic components are spaced from each other by 90 electrical degrees, or by $n \times 360 + 90$ electrical degrees, where $n$ is an integer including zero and one. In the case of the illustrated 8-pole motor, which has a total of sixteen individual poles, it is particularly advantageous when the spacing between the triangular members 59a, 59b is 810 electrical degrees. That spacing can be very advantageous in view of possible geometric irregularities of the magnetic ring or of other parts of the magnetic circuit of the motor, such as the return member 49. For instance, if there is an eccentric bore in the magnetic ring, different coil triggering currents produced as a result of field fluctuations will in part cancel each other, and will in that manner somewhat reduce the generation of undesirable momentary field fluctuations.

It will be understood that each of the elements described above, or two or more together, may also find a useful application in other types of constructions differing from the types described above.

While the invention has been illustrated and described as embodied in motors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. A collectorless DC motor for driving signal recording devices and signal reproducing devices, comprising, in combination, a stator comprising a central support portion provided with a mounting passage, an outwardly extending mounting member for mounting the motor on a structural support, and an axial bearing portion, said stator additionally comprising a generally plate-shaped winding arrangement fixedly mounted on said support portion and surrounding said passage; a rotor comprising a rotor shaft extending through said passage transversely through said winding arrangement so as to be encircled by the latter and having an end bearing axially upon said axial bearing portion, an axially polarized permanent magnet arrangement encircling said shaft, said winding arrangement and said magnet arrangement having facing first axial sides axially spaced to define a first axial air gap and having opposite second axial sides, a first magnetic return structure encircling said shaft and located adjacent said second axial side of said magnet arrangement, and a second magnetic return structure encircling said shaft and located adjacent to said second axial side of said winding arrangement axially spaced from the latter to define therewith a second axial air gap, said magnetic arrangement and said first and second magnetic return structures being mounted on said shaft for rotation therewith and connected together at the radially outer portions thereof; and output means connected with said shaft at a portion of said shaft axially spaced from said magnetic arrangement and said return structures and operative for transmitting driving force from said rotor shaft to a device to be driven by said motor.

2. A motor as defined in claim 1, wherein said support portion comprises a hollow generally cylindrical support body provided with said outwardly extending mounting member and further provided with axially extending radial bearing means for radially supporting said winding arrangement, said mounting member being located at one axial end of said cylindrical support body.

3. A motor as defined in claim 2, wherein said central support portion is provided with an interior chamber having an axial end wall constituting said axial bearing portion, and wherein said output means comprises an output drive gear mounted on said rotor shaft for rotation therewith and located in said interior chamber.

4. A motor as defined in claim 3, wherein said axial bearing portion is axially adjustable.

5. A motor as defined in claim 1, wherein said winding arrangement comprises a plurality of windings arranged in a ring around said shaft, each of said windings being comprised of coils lying in planes generally transverse to the elongation of said shaft, and the overall adjustment of windings having a generally disc-like shape.

6. A motor as defined in claim 5, wherein said winding arrangement is comprised of a non-magnetic carrier arrangement of generally annular disc-shaped configuration having an inner periphery mounted on said support portion and a plurality of radially extending ribs connected together at their radially innermost ends and at their radially outermost ends and holding said windings in position on said carrier arrangement.

7. A motor as defined in claim 6, wherein said plurality of windings comprise a first plurality of windings located at one axial side of said carrier arrangement in a first general plane and a second plurality of windings located at the other side of said carrier arrangement in a second general plane, said first and said second plurality of windings being each arranged in a ring around said shaft, and wherein said retaining ribs lie in first and second planes in correspondence to the respective planes of said windings, and wherein said retaining ribs further have widened portions each serving to engage the inner periphery of a respective one of said windings.

8. A motor as defined in claim 7, wherein two of said widened portions additionally serve to each support at least one electronic component associated with control circuitry for the motor, and wherein said windings are energized by 90° out-of-phase currents, and wherein said two widened portions are associated with windings spaced apart by $n$ times 360 plus 90 electrical degrees, where $n$ is an integer including zero and one.

9. A motor as defined in claim 7, wherein at least one of said widened portions additionally serves to support at least one electronic component associated with control circuitry for the motor, and wherein said carrier arrangement includes a circuit board on the central portion of said carrier arrangement, said circuit board being provided with connections to said electronic component and carrying the terminals of said windings, and wherein said circuit board if furthermore provided with a printed circuit, and wherein said circuit board overlies the radially innermost portions of at least some of said windings.

10. A motor as defined in claim 5, wherein at least some of said windings are formed of two distinct and separately energizable electrical conductors.

11. A motor as defined in claim 1, wherein said permanent magnet arrangement is comprised of a magnet ring comprised of ring sectors polarized axially in a first sense and alternating with ring sectors polarized axially in the opposite sense, and wherein at least one of said first and second magnetic return structures is held in place by the force of magnetic attraction of said magnet ring.

12. A motor as defined in claim 1, wherein said rotor comprises a generally cup-shaped ferromagnetic member at least a portion of which constitutes said first magnetic return structure, and wherein said permanent magnets are supported directly on the axial side of said cup-shaped member which faces said winding arrangement, and wherein said second magnetic return structure is maintained in centered position by the rim portion of said cup-shaped member.

13. In an electric motor, particularly a collectorless DC motor, in combination, a stator comprising a support portion having a passage and a generally plate-shaped winding arrangement fixedly mounted on said support portion and surrounding said passage; and a rotor comprising a rotatable motor shaft extending through said passage and a plurality of axially polarized magnets mounted on said shaft for rotation therewith and axially spaced from said winding arrangement and defining therewith an axial air gap, wherein said winding arrangement is generally disc-shaped and includes a carrier arrangement of generally annular disc-shaped configuration, and a first plurality of windings carried on said carrier arrangement and located at one axial side thereof in a second general plane, each of said plurality of windings being arranged in a ring around said shaft, and each of said windings being comprised of coils lying in planes generally transverse to the elongation of said shaft, and said carrier arrangement having retaining means for retaining said pluralities of windings in the respective planes, wherein said retaining means comprises a plurality of radially extending retaining ribs, and wherein said retaining ribs lie in first and second planes in correspondence to the respective planes of said windings, and wherein said retaining ribs further have widened portions each serving to engage the inner periphery of a respective one of said windings, and wherein two of said widened portions additionally serve to each support at least one electronic component associated with control circuitry for the motor, and wherein said windings are energized by 90° out-of-phase currents, and wherein said two widened portions are associated with windings spaced apart by $n$ times 360 plus 90 electrical degrees, where $n$ is an integer including zero and one.

14. A collectorless DC motor for driving signal recording devices and signal reproducing devices, comprising, in combination, a stator comprising a central support portion provided with a mounting passage and an axial bearing portion, said stator additionally comprising a generally plate-shaped winding arrangement fixedly mounted on said support portion and surrounding said passage; and a rotor comprising a rotor shaft extending through said passage transversely through said winding arrangement so as to be encircled by the latter and having an end bearing axially upon said axial bearing portion, an axially polarized permanent magnet arrangement encircling said shaft, said winding arrangement and said magnet arrangement having facing first axial sides axially spaced to define a first axial air gap and having opposite second axial sides, a first magnetic return structure encircling said shaft and located adjacent said second axial side of said magnet arrangement, and a second magnetic return structure encircling said shaft and located adjacent to said second axial side of said winding arrangement axially spaced from the latter to define therewith a second axial air gap, said magnetic arrangement and said first and second magnetic return structures being mounted on said shaft for rotation therewith and connected together at the radially outer portions thereof.

* * * * *

Disclaimer 3,845,339.—*Alfred Merkle*, St. Georgen, *Fritz Schmifder*, Hornberg, and *Werner Heinzmann*, St. Georgen, Germany. PERMANENT MAGNET ROTOR ELECTRIC MOTOR. Patent dated Oct. 29, 1974. Disclaimer filed Dec. 6, 1976, by the assignee, *Papst-Motoren KG*.

Hereby enters this disclaimer to claim 14 of said patent.

[*Official Gazette February 1, 1977.*]